US007454140B2

United States Patent
Jette et al.

(10) Patent No.: US 7,454,140 B2
(45) Date of Patent: *Nov. 18, 2008

(54) FIBER TO THE HOME BROADBAND HOME UNIT

(75) Inventors: Michael H. Jette, Grapevine, TX (US); Jeffrey H. Nielson, Grapevine, TX (US); Long Van Vo, Plano, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/865,180

(22) Filed: Oct. 1, 2007

(65) Prior Publication Data

US 2008/0025725 A1    Jan. 31, 2008

Related U.S. Application Data

(63) Continuation of application No. 10/750,699, filed on Jan. 2, 2004, now Pat. No. 7,277,637.

(60) Provisional application No. 60/437,789, filed on Jan. 3, 2003.

(51) Int. Cl.
 *H04J 14/00* (2006.01)
(52) U.S. Cl. ............................. 398/70; 398/58
(58) Field of Classification Search ............ 398/58, 398/63, 64, 66–72, 167.5
See application file for complete search history.

(56) References Cited

U.S. PATENT DOCUMENTS

| 5,144,669 | A | * | 9/1992 | Faulkner et al. | 380/212 |
| 5,381,412 | A | * | 1/1995 | Otani | 370/391 |
| 5,781,320 | A | | 7/1998 | Byers | |
| 5,793,427 | A | * | 8/1998 | Mills et al. | 348/391.1 |
| 6,362,908 | B1 | | 3/2002 | Kimbrough et al. | |
| 7,277,637 | B2 | * | 10/2007 | Jette et al. | 398/70 |
| 2002/0063924 | A1 | | 5/2002 | Kimbrough et al. | |

* cited by examiner

Primary Examiner—Christina Y Leung
(74) Attorney, Agent, or Firm—Baker Botts L.L.P.

(57) ABSTRACT

An apparatus and system are provided for delivering communication services such as video, data and telephony services to individual residential units.

According to one embodiment, an optical network terminal (ONT) for providing communication services to a single residential unit comprises a passive optical network interface (PI) circuit, a residential service interface (RSI) circuit, and a power unit. The PI circuit receives optical signals from an optical fiber and transmits optical signals onto the optical fiber. The PI circuit is adapted to convert received optical signals containing voice information to electrical voice ATM cells, received optical signals containing data information to electrical data ATM cells, and received optical signals containing video signals to electrical video signals. The PI circuit is also adapted to convert electrical voice ATM cells and electrical data ATM cells to optical signals for transmission over the optical fiber.

20 Claims, 11 Drawing Sheets

FIBER TO THE HOME BROADBAND HOME UNIT

RELATED APPLICATION

This application is a continuation application of U.S. application Ser. No. 10/750,699 filed Jan. 2, 2004 and now U.S. Pat. No. 7,277,637, which claims the benefit of U.S. Provisional Application No. 60/437,789, filed Jan. 3, 2003, each of which is hereby incorporated herein by reference.

TECHNICAL FIELD OF THE INVENTION

The systems and methods described in this patent document relate generally to optical networks and more specifically to fiber to the home optical systems.

BACKGROUND OF THE INVENTION

Optical networks can be used to deliver communication services to businesses and homes. Optical networks have the capability of delivering a variety of services such as video, data, and telephony services. The optical network devices that are presently considered for providing residential services typically are devices such as optical network units that are designed to provide services to multiple residential units and are not appropriate for use with a single residential unit.

SUMMARY OF THE INVENTION

An apparatus and system are provided for delivering communication services such as video, data and telephony services to individual residential units.

According to one embodiment, an optical network terminal (ONT) for providing communication services to a single residential unit comprises a passive optical network interface (PI) circuit, a residential service interface (RSI) circuit, and a power unit. The PI circuit receives optical signals from an optical fiber and transmits optical signals onto the optical fiber. The PI circuit is adapted to convert received optical signals containing voice information to electrical voice ATM cells, received optical signals containing data information to electrical data ATM cells, and received optical signals containing video signals to electrical video signals. The PI circuit is also adapted to convert electrical voice ATM cells and electrical data ATM cells to optical signals for transmission over the optical fiber.

The RSI circuit that is adapted to convert the electrical voice ATM cells to a telephony format suitable for use at the residential unit and the electrical data ATM cells to a data network format suitable for use at the residential unit. The RSI circuit is also adapted to convert telephony format information received from the residential unit to voice ATM cells and data network format information received from the residential unit to data ATM cells.

The power unit provides power for use in the PI circuit and the RSI circuit. The power unit includes an AC/DC converter for converting ac power received from the residential unit to dc power for use in the ONT and backup batteries for providing power when there is an interruption of the ac power.

Figure 1:
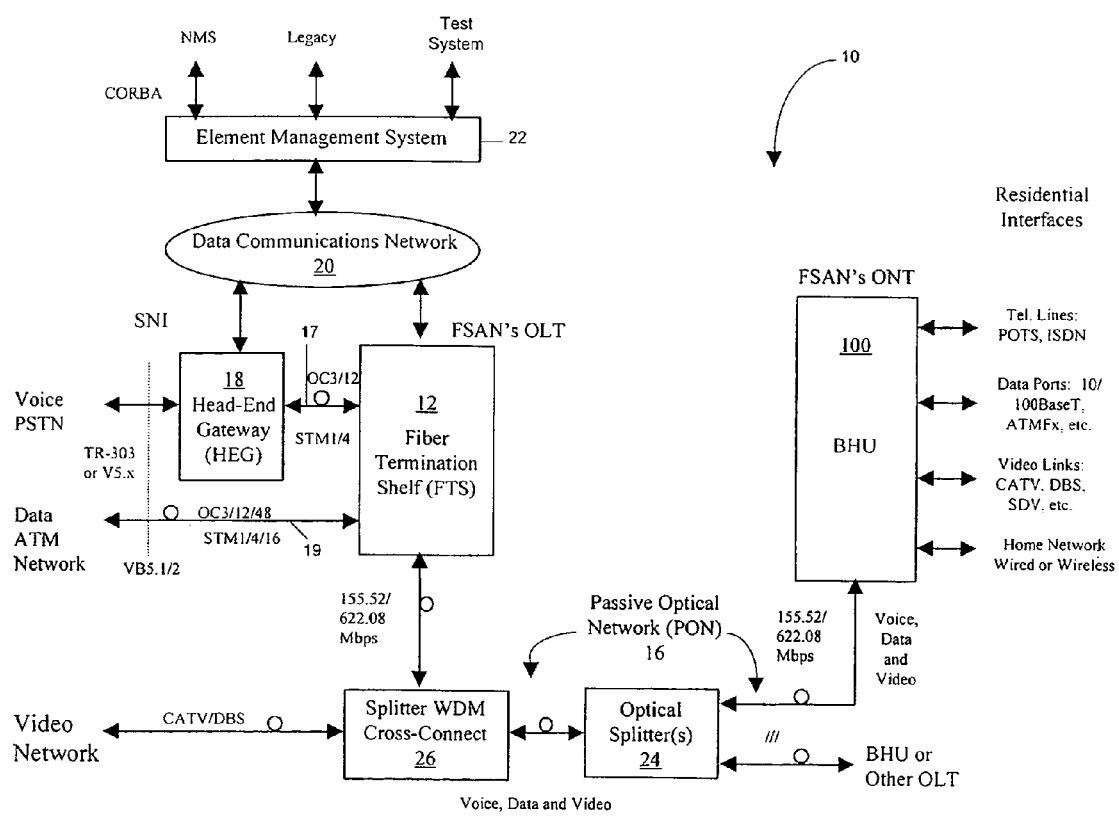
FIG. 1 is a block diagram of an exemplary embodiment of a full service access network.

For simplicity and clarity of illustration, elements shown in the figures are not drawn to scale. Also, reference numerals that appear in multiple figures indicate that the exemplary systems illustrated in the figures may have corresponding or analogous elements.

DEFINITIONS AND ACRONYMS

Acronyms
    AAL ATM Adaptation Layer
    ABR Available Bit Rate
    AC Alternate Current
    AIS Alarm Indication Signal
    APD Avalanche Photo-Diode
    API Application Programming Interface
    APON ATM Passive Optical Network
    ARM Advanced RISC Machine
    ATM Asynchronous Transfer Mode
    BIP Bit Interleaved Parity
    B-ISDN Broadband Integrated Services Digital
Network
    BER Bit Error Rate
    BHU Broadband Home Unit
    BHU200 Broadband Home Unit 200 (First Release Outdoor Unit)
    BLES Broadband Loop Emulation Service
    BPDU Bridge Protocol Data Unit
    BPON Broadband Passive Optical Network
    B-RAS Broadband Remote Access Server
    CBR Constant Bit Rate
    CO Central Office
    CRC Cyclic Redundancy Check
    DACT Deactivate PON_ID
    DBA Dynamic Bandwidth Allocation
    DC Direct Current
    DSP Digital Signal Processing
    EMI Electro-Magnetic Interference
    EMC Electro-Magnetic Compatibility
    EMS Element Management System
    E/O Electrical to Optical
    EOC Embedded Operations Channel
    EPD Early Packet Discard
    ERR Block Error Detection
    FCC Federal Communications Commission
    FCS Frame Check Sequence FTS Fiber Termination Shelf
FRML Loss of Downstream Frame
FSAN Full Service Access Network
FTTB Fiber To the Business
FTTC Fiber To The Cabinet
FTTH Fiber To The Home
FTTN Fiber To The Node
GFR Guaranteed Frame Rate
HEC Header Error Control
HEG Head-End Gateway
ID Identification
ISDN Integrated Services Digital Network
ITU International Telecommunication Union
ITU-T Telecommunication Standardization Sector of ITU
LAN Local Area Network
LCD Loss of Cell Delineation
LED Light Emitted Diode
LOS Loss Of Signal
Mbps Megabits per second
MDCR Minimum Desired Cell Rate
MIB Management Information Base
MII Media Independent Interface
MIPS Million Instructions Per Second
MIS Link Mismatch
NM nano meter
NRZ Non Return to Zero
OAM Operations, Administration, and Maintenance
OAML PLOAM Cell Loss
O/E Optical to Electrical
OLT Optical Line Terminal
OMCC ONT Management and Control Channel
OMCI ONT Management and Control Interface
ONT Optical Network Terminal
PCM Pulse Code Modulation
PEE Physical Equipment Error
PHY PHYsical Layer Device
PLD Programmable Logic Device
PI PON Interface
PLOAM Physical Layer OAM cell
PON Passive Optical Network
POTS Plain Old Telephone Service
PPD Partial Packet Discard
PPPoA Point to Point Protocol over ATM
PPPoE Point to Point Protocol over Ethernet
PPTP Point to Point Tunneling Protocol
PVC Permanent Virtual Circuit
PVP Permanent Virtual Path
QoS Quality of Service
RDI Remote Defect Indication
RSI Residential Service Interface
SAR Segmentation And Reassembly
SD Signal Degraded
SDRAM Synchronous Dynamic Random Access Memory
SDV Switched Digital Video
SFU Single Family Unit (formerly name of BHU)
SIP Session Initiation Protocol
SNI Service Node Interface
SNMP Simple Network Management Protocol
SRS System Requirements Specification
SUF Start-Up Failure
SVC Switched Virtual Circuit
TBD To Be Determined
TC Transmission Convergence
TF Transmitter Failure
TRS Technical Requirements Specifications
UBR Unspecified Bit Rate
UL Underwriters Laboratories
UNI User Network Interface
UPS Uninterrupted Power Supply
UTOPIA Universal Test and Operations Interface for ATM
VBR Variable Bit Rate
VC Virtual Channel
VCC Virtual Circuit Connection
VCI Virtual Circuit Identifier
VoATM Voice over Asynchronous Transfer Mode
VoIP Voice over Internet Protocol
VP Virtual Path
VPC Virtual Path Connection
VPI Virtual Path Identifier
WAN Wide Area Network
xDSL x Digital Subscriber Line Definitions Network Element—A Network Element (NE) refers to all the equipment (including shelves, cards, and modules) that is managed by one management entity. No equipment can belong to multiple NEs at the same time.

Power Shedding—Power Shedding refers to the capability of shutting down unnecessary services in a power failure event in order to preserve a certain number of 20 hours (e.g. 8) of battery power for defined minimum services.

Circuit—A circuit refers to a set of elements, wherein some or all of the elements in a first circuit can also be members of the set of elements making up a second circuit.

DETAILED DESCRIPTION OF THE INVENTION

With reference to the figures, shown in FIG. 1 is an exemplary Full Service Access Network (FSAN) 10. The exemplary FSAN 10 comprises an Optical Line Terminal (OLT) 12, at least one Optical Network Terminal (ONT) 100, and a Passive Optical Network (PON) 16 coupled between the OLT 12 and the ONT 100 for transporting voice, data, and/or video information to and/or from the ONT 100. The PON optionally could be an ATM Passive Optical Network (APON), a Broadband Passive Optical Network (BPON), or some other type of Passive Optical Network.

The OLT 12 preferably comprises a Fiber Termination Shelf (FTS). The preferred OLT 12 has a connection to a Voice public switched telephone network (PSTN) preferably through an optical path 17 and a Head-End Gateway (HEG) 18. But, as an option the HEG could be integrated into the OLT 12. The preferred OLT 12 also has a connection to a Data ATM network preferably through another optical path 19.

The OLT 12 transfers voice and data information in a downstream direction to the PON 16 for forwarding to one or more ONTs 100 and transfers voice and data information received from the PON 16 upstream to a voice PSTN and Data ATM network, respectively. In addition, the preferred OLT 12 has a connection via a data communication network 20 to an Element Management System 22 for provisioning, error reporting, troubleshooting, testing and other network management operations.

The preferred ONT 100 is a Broadband Home Unit (BHU). The preferred BHU complies with the ITU-T G.983 Full Service Access Network (FSAN) requirements. The preferred BHU 100 provides broadband and narrow-band services to a single residential unit. The narrow-band services include telephony services such as POTS and ISDN. The broadband services include high-speed data, video, and home networking. The BHU 100 transports high-speed data and telephony PCM traffic received, via the PON 16, from the OLT 12 to the residential unit and transports high-speed data and telephony PCM traffic received from the residential unit to the OLT 12, via the PON 16. The BHU 100 also receives video signals via the PON 16 from a video network and provides the video signals to the residential unit.

The preferred PON 16 comprises one or more optical splitters 24 that are coupled between a splitter wavelength division multiplexer (WDM) Cross-Connect 26 and one or more OLTs 100. The preferred WDM cross-connect 26 has a fiber optic connection to a video network such as CATV or DBS, a fiber optic connection to the OLT 12 and a fiber optic connection to the PON 16. The WDM provides connections for transferring video information from the video network to the PON 16, and provides connections for transferring voice and data signals between the OLT 12 and the PON 16.

Figure 2A:
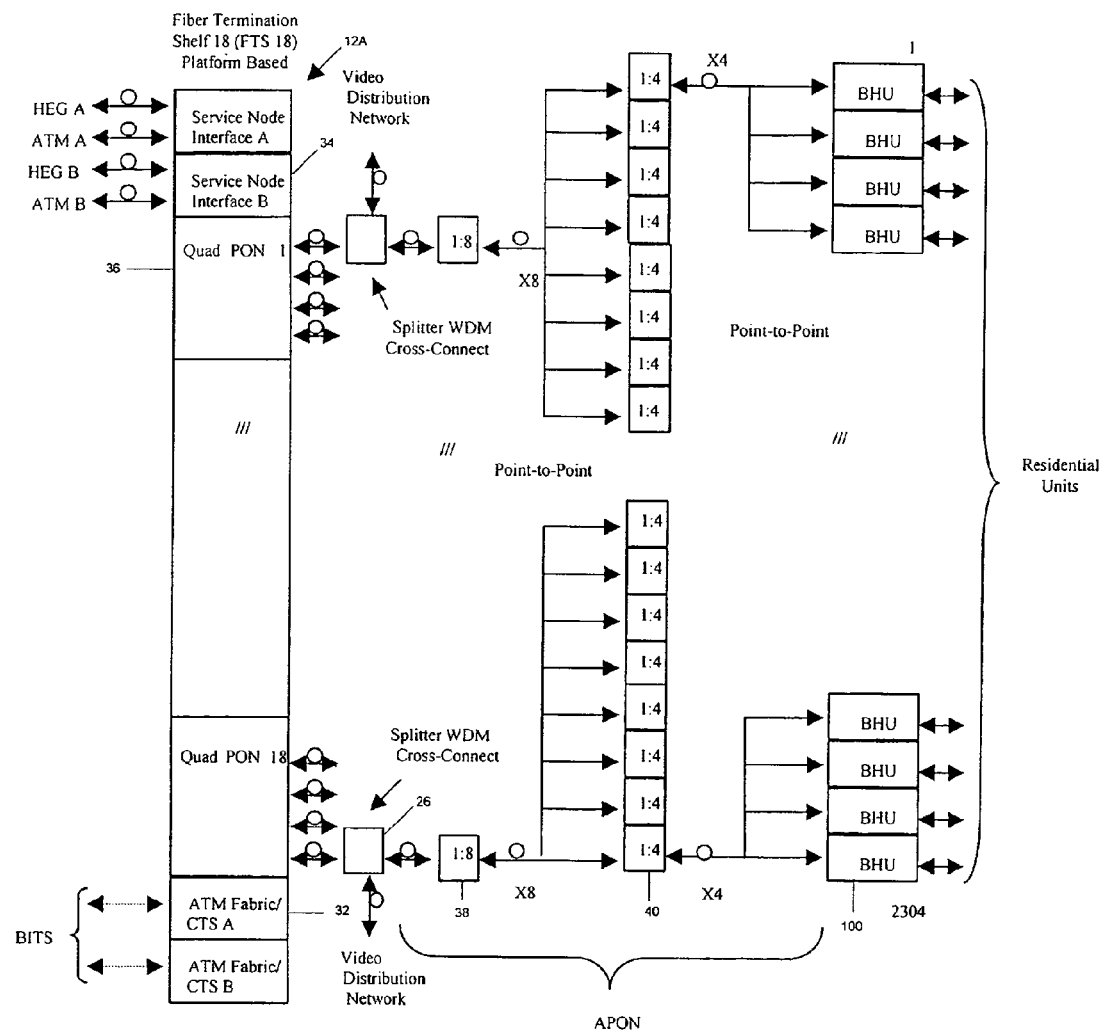
FIGS. 2A & 2B are block diagrams of exemplary embodiments of full service access networks having different service provision capabilities.
Figure 2B:
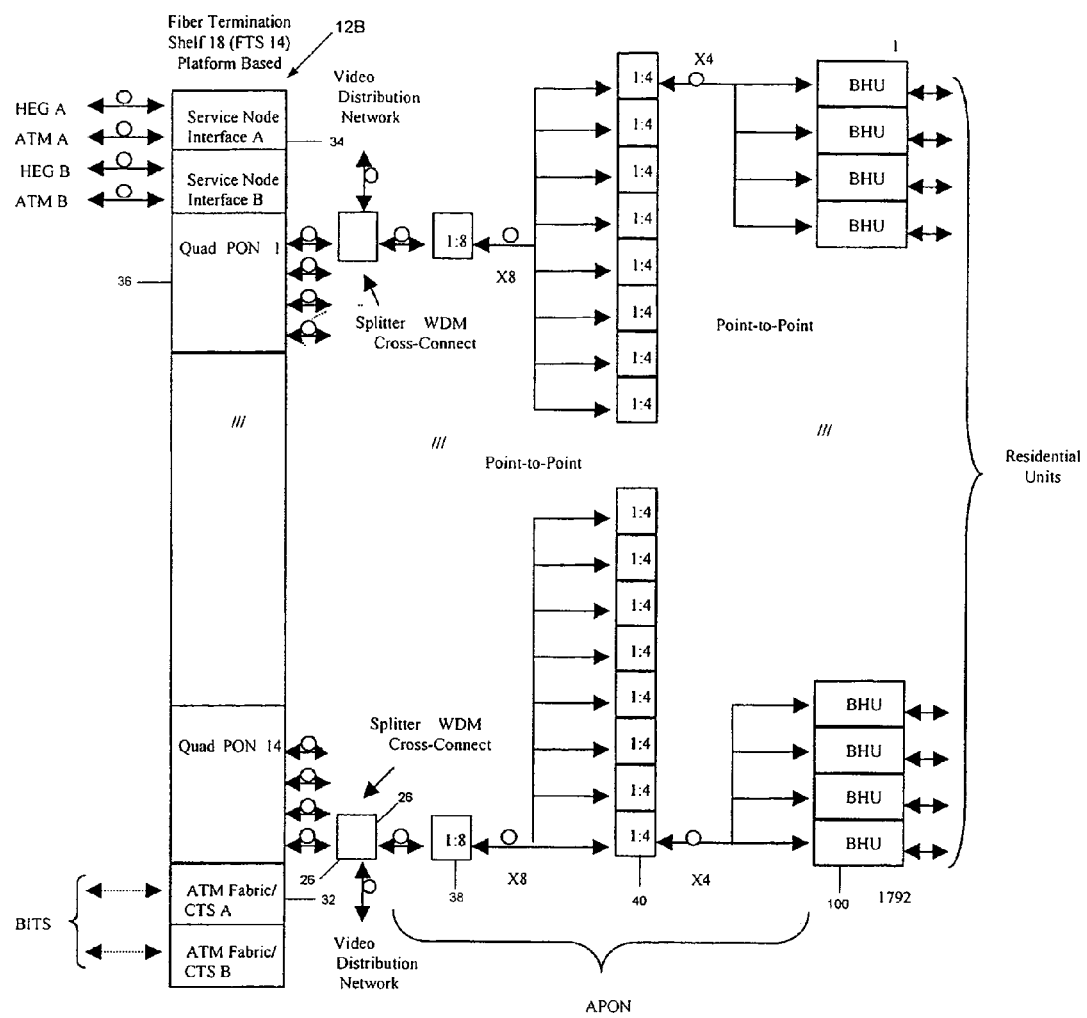

Shown in FIGS. 2A and 2B are exemplary block diagrams of FSANs that use OLTs 12 that have different service capabilities. The exemplary FSAN of FIG. 2A comprises a FTS 18 platform 12A that is capable of providing data and voice services for up to 2304 residential units. The exemplary FSAN of FIG. 2B comprises a Fiber FTS 14 platform 12B that is capable of providing data and voice services for up to 1792 residential units. Primary differences between the two platforms include difference in their overall mechanical dimensions and differences in the number of card slots each platform can support. Each platform preferably houses ATM fabric and centralized timing source (CTS) circuit boards 32, service node interface circuit boards 34, and quad passive optical network (PON) circuit boards 36. The exemplary FTS 18 platform 12A of FIG. 2A preferably can include up to 18 quad PON cards and the exemplary FTS 14 platform 12B of FIG. 2B preferably can include up to 100 quad PON cards. Preferably each quad PON card 36 is capable of exchanging traffic with four splitter WDM cross-connects 26. Each splitter WDM cross-connect 26 is preferably capable of exchanging traffic with the optical splitters 24 illustrated in FIG. 1, which correspond to a 1:8 optical splitter 38 and eight 1:4 optical splitters 40 of FIGS. 2A and 2B. Each 1:4 optical splitter 40 is capable of exchanging traffic with four BHUs 100.

Figure 3:
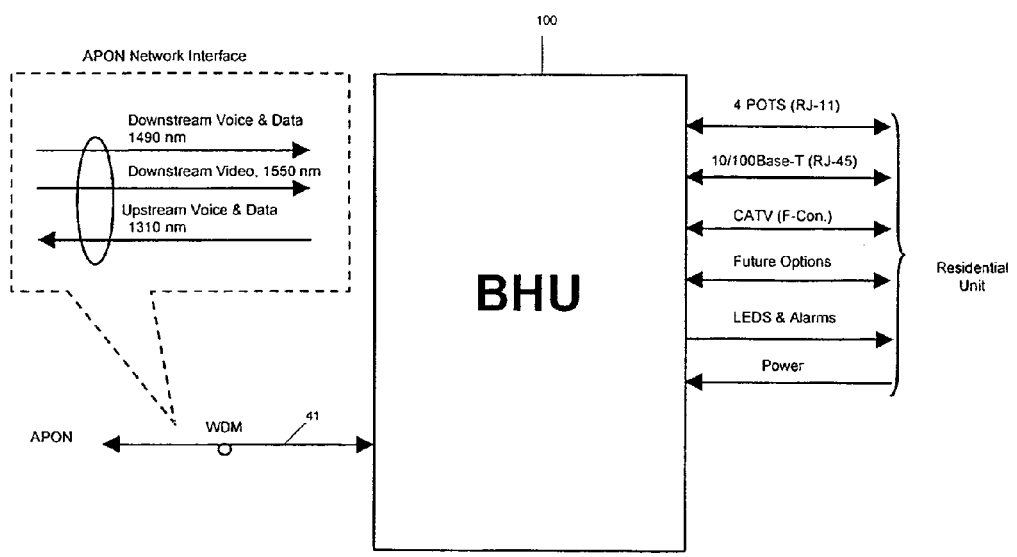
FIG. 3 is a block diagram illustrating input and output connections of an exemplary embodiment of a broadband home unit.

The exemplary BHU 100, as illustrated in FIG. 3, has a number of interfaces for transferring voice, data, video, and other information between a residential unit and an optical network. The exemplary BHU 100 includes an interface for up to four telephony lines such as POTS via RJ-11 connectors. The exemplary BHU 100 also includes an interface for network traffic such as a10/100 Base-T network via RJ-45. The exemplary BHU 100 further includes an interface for video services such as CATV or DBS via an F-connector. The exemplary BHU 100, in addition, includes, an interface for providing alarm and status indication information to the residential unit, an interface for receiving power from the residential unit, and an interface for other optional services. For transferring voice, data, video, and other information between the BHU 100 and an optical network such as a PON, the exemplary BHU 100 includes an interface for exchanging WDM optical traffic over a single fiber 41. In the example illustrated in FIG. 3, downstream voice & data is received at a 1490 NM wavelength, downstream video is received at a 1550 NM wavelength, and upstream voice and data is transmitted at a 1310 NM wavelength on the fiber 41.

Overall the preferred BHU 100 is a Fiber-To-The-Home (FTTH) Optical Network Terminal (ONT) that includes a PON interface, provides telephony services, provides data services, provides video services, provides future service options, provides traffic management services, and includes power circuits and status indicators.

With regard to its PON interface, the preferred BHU 100 transmits upstream data & telephony at 1310 NM, receives downstream data & telephony at 1490 NM, and receives downstream Video at 1550 NM. The data rates handled by the preferred BHU 100 include 155.52 Mbps downstream and 155.52 Mbps upstream but may optionally include 622.08 Mbps downstream and 155.52 Mbps upstream, 622.08 Mbps downstream and 622.08 Mbps upstream, or other bit rate combinations. The preferred BHU 100 supports fixed bandwidth allocation and may optionally support dynamic bandwidth allocation.

Regarding the provision of telephony services, the preferred BHU 100 provides a POTS and/or ISDN interface. The transport format in the preferred BHU 100 comprises VoATM/AAL-2 using PVC and CBR. Optionally, the transport format may comprise VoATM/AAL-1 and/or VoIP over ATM (AAL-5) using SVC and rtVBR or other transport formats.

Regarding the provision of data services, the preferred BHU 100 provides a 10/100 Base-T interface but may provide other interfaces such as a Gigabit Ethernet interface, an ATM Forum Interface, or a USB interface. The preferred BHU 100 employs fixed bandwidth allocation but optionally may employ dynamic bandwidth allocation.

With regard to providing video services, the preferred BHU 100 provides full-bandwidth CATV (54 MHz-870 MHz) but may optionally provide limited-bandwidth CATV (54 MHz-370 MHz), DBS (950 MHz-2050 MHz), Switched Digital Video (SDV), and/or set-top box return. In regards to providing future services options, the preferred BHU 100 may make provisions for supporting a Home Wired Network and/or a Home Wireless Network.

Figure 4:
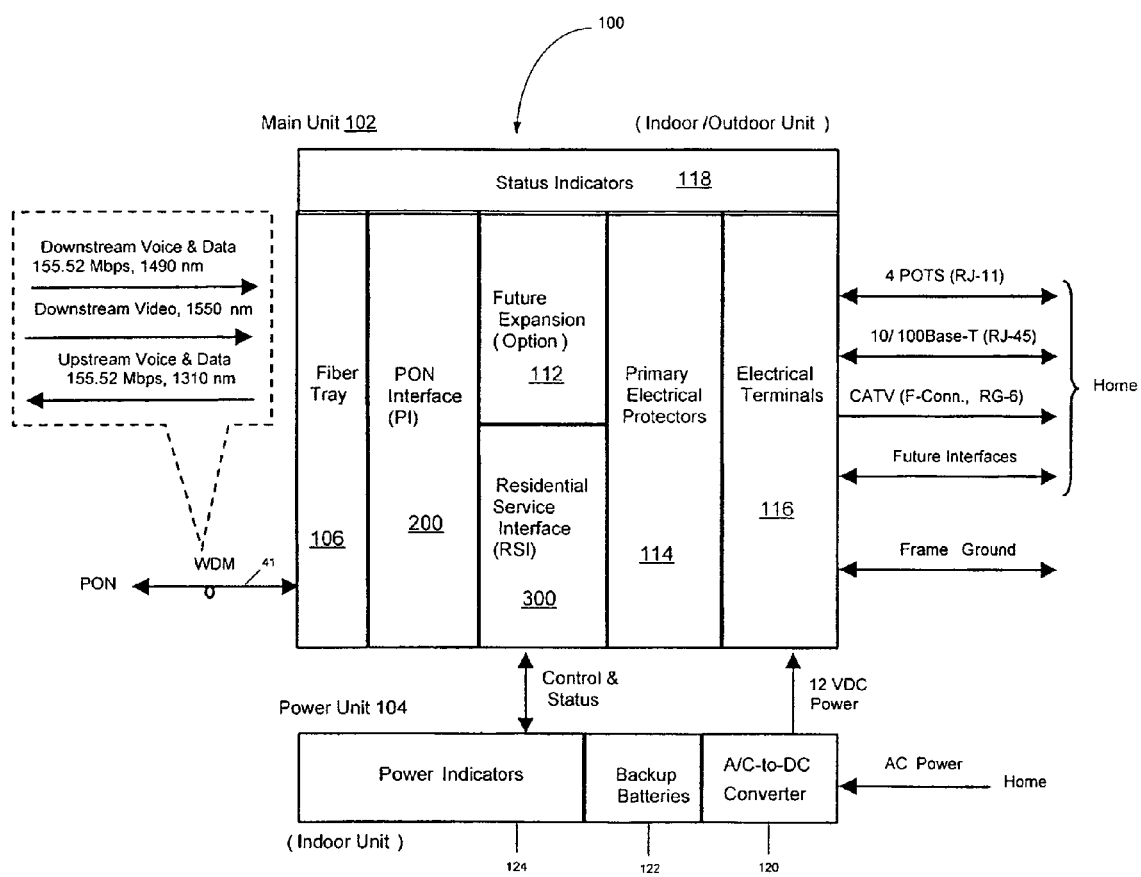
FIG. 4 is a block diagram illustrating exemplary sections of a broadband home unit.

As illustrated in FIG. 4, the preferred BHU 100 comprises a main unit 102 and power unit 104. The exemplary main unit 102 contains a fiber mechanical protector tray 106, a PON Interface (PI) module 200, a residential service interface (RSI) module 300, a future expansion (FE) module 112, primary electrical protectors 114, electrical terminals 116, and status indicators 118.

The fiber mechanical protector (or fiber tray) 106 provides mechanical protection for the WDM optical fiber 41 received by the BHU 100 to reduce the likelihood of the optical fiber 41 from a PON to the BHU 100 from being damaged by mechanical contacts. The fiber tray 106 provides fiber slack management to prevent stresses/damages during installation and maintenance. The fiber tray 106 also provides fiber jacket termination. Preferably the fiber tray 106 prevents the connection point for the fiber 41 from being accessible to the general public but provides access for service provider technicians.

The PI module 200 provides a physical interface for the fiber 41. The PI module 200 receives optical signals from the fiber 41, converts the received optical voice and data ATM signals to electrical ATM cells, and converts the received optical video signals to electrical video signals. The converted electrical ATM cells are then forwarded to the RSI module 300 for further processing and the electrical video signals are forwarded to the primary electrical protectors 114 for forwarding to the residential unit. The PI module 200 also converts electrical voice and data ATM cells received from RSI module 300 to optical signals for transmission over the optical fiber 41. The PI module 200 terminates and generates PON Physical Layer including PLOAM cells. The PI module 200 transports ATM cells to and from the RSI module 300 preferably via a Utopia-2 port. The exemplary PI module 200 also receives DC power from the RSI module 300 and derives other necessary voltages on-board.

The RSI module 300 processes ATM packets received from the PI module 200, converts the packets to PCM voice and data, and transports the PCM voice and data to the primary electrical protectors 114. The RSI module 300 also receives PCM voice and data from the primary electrical protectors 114 that were received from the residential unit via the POTS and 10/100Base-T Ethernet interfaces at the electrical terminals 116, converts the PCM voice and data to ATM packets, and forwards the ATM packets to the PI module 200 for conversion to optical signals and transmission via the PON. The RSI module 300 receives and transmits ATM cells from and to the PI module 200 preferably via a Utopia-2 interface. The exemplary RSI module 300 processes ATM Layer, ATM Adaptation Layer, and OMCI layer. The exemplary RSI module 300 also provides priority queuing, traffic scheduling, and traffic shaping.

The RSI module preferably includes a central processor that provides central processing services for many circuits and modules in the BHU 100. The exemplary RSI module 300 also provides a processor interface for use in the PI module 200 for control functions and a D.C. power interface for providing power to the PI module 200. The RSI module also preferably provides an additional connector with a Utopia-2 port, processor interface, optional MII interface, and power for future use by an optional future expansion module 112.

The primary electrical protectors 114 provide electrical protection for the PI module 200, RSI module 300, FE module 112, and external interfaces. The primary electrical protectors 114 provide protection against potential hazards such as lightning, power irregularity, and EMI that cables and signal lines connected between the residential unit and the BHU 100 may be subject to by providing protection circuits. The primary electrical protectors 114 preferably provide protection for various interfaces such as POTS and/or ISDN, 10/100Base-T Ethernet, CATV and/or DBS, DC power input, alarm interfaces, and future expansion interfaces. The primary electrical protectors 114 preferably provide protection in accordance with Articles 800-30 and 800-31 of the National Electrical Code, ANSI/NFPA 70. Preferably, the primary electrical protectors 114 are physically located separate from other circuits in the BHU 100 such the PI module 200, the RSI module 300, and the future expansion module 112. Preferably the primary electrical protectors 114 are not accessible to the general public but accessible for service provider technicians.

The electrical terminals 116 are portion of the main unit that provide physical service connections for the residential unit and test terminals for use by service provider technicians. The electrical terminals 116 are the section of the main unit where the electrical cables that carry electrical signals to the residential unit and the electrical cables that carry electrical signals from the residential unit physically connect to the BHU 100. The electrical terminals 116 preferably include electrical terminals for POTS and/or ISDN, 10/100Base-T Ethernet, CATV and/or DBS, DC input, alarm interfaces, and future expansion interfaces. The electrical terminals 116 may optionally include test interfaces such as RJ-11 connectors to allow service provider technicians to test POTS lines, a RJ-45 connector to allow service provider technicians to test a 10/100Base-T port, and an F-connector to allow service provider technicians to test CATV channels and/or DBS channels. Preferably, the electrical terminals 116 are physically located separate from other circuits in the BHU 100 such the PI module 200, the RSI module 300, and the future expansion module 112. Preferably the electrical terminals 116 are not accessible to the general public but are accessible for service provider technicians. The electrical terminals 116 preferably include a control access medium such as a limited access door to prevent public access and to protect electrical terminals and cable connections.

Preferably the BHU 100 also includes a future expansion module 112. The future expansion module 112 optionally provides circuitry, space, physical interfaces and/or features that may be added to the BHU 100 in the future. The future expansion module 112 preferably is capable of transporting ATM cells to and from the RSI module 300 via a Utopia-2 port. The future expansion module 112 preferably provides status information to the RSI module 300. The future expansion module 112 preferably is configured and controlled by the RSI module 300, receives power from the RSI module, and provides future interface or feature capabilities such as a home wired networking interface, a home wireless networking interface, extra data ports such as ATM25, and additional processing resources. The future expansion module 112 preferably includes on-board DC/DC converters and/or voltage regulators and provides test ports. The Future Expansion module preferably is contained within an electronic enclosure along with the PI module 200 and the RSI module 300. Preferably the future expansion module 112 is not accessible to the general public or service provider technicians and should not be installed in the field.

The exemplary BHU 100 also includes status indicators 118. The status indicators 118 provide indicators of the status of various subsystems, functions, and/or services of the BHU 100. The status indicators 118 preferably comprise LEDs that are visible externally to and/or internally in the BHU 100.

The power unit 104 of the exemplary BHU 100 preferably includes an A/C-to-DC converter 120, backup batteries 122, and power indicators 124. The preferred A/C-to-DC converter has an input for receiving A/C input power from an A/C input power source, an input for receiving 12 VDC from the backup batteries 122, and an output for delivering a 12 VDC output to components of the main unit 102 of the BHU 100. The preferred A/C-to-DC converter 120 converts the A/C input power to a 12 VDC output and also bridges the 12 VDC input received from the backup batteries 122 to the 12 VDC output when the A/C input is unavailable. The backup batteries 122 preferably comprise multiple batteries connected in series to provide a 12 VDC power source to the A/C-to-DC Converter 120 as a backup power source. The backup batteries 124 preferably comprise C or D type disposable batteries and optionally could be a UPS arrangement.

The preferred power indicator module 124 provides indicators that provide indications of the status of the A/C input and backup batteries 122. The preferred power indicator module 124 detects when the A/C input is unavailable and when the backup batteries 122 are providing a low voltage output. The preferred power indicator module 124 includes a "Battery Low/Failed" LED, an AC Failed LED, a "Battery Low/Failed" Audible Alarm, a "Battery Low/Failed" Audible Alarm Manual Disable, and a serial interface to and from the Main Unit 102. Preferably the LEDs provide a green indication when they are indicating that the status of the monitored function is within tolerances and provide a red or other color indication when they indicate that the status of the monitored function is not within tolerances. Preferably all indicators can be viewed or heard without opening the housing unit for the power unit 104.

The BHU 100 employs a power shedding algorithm on A/C Fail with preferably four programmable configurations. When the BHU 100 is operating on batteries it goes into a power shed mode. If the AC is restored, the BHU 100 will stop operating in the power shed mode and operate in a full operation mode. Preferably, the customer at installation is provided with an option of which services will be operational during power shed mode operation. Preferably the customer can choose one of the following options: (1) a selected POTS/ISDN port is on; (2) a selected POTS/ISDN port and a selected data link are on; (3) two selected POTS/ISDN ports are on; or (4) two selected POTS/ISDN ports and a selected data link are on. The power shedding mode allows the BHU 100 to shut down unnecessary services in a power failure event in order to preserve a certain number of hours (e.g. 8) of battery power for defined minimum services.

Figure 5:
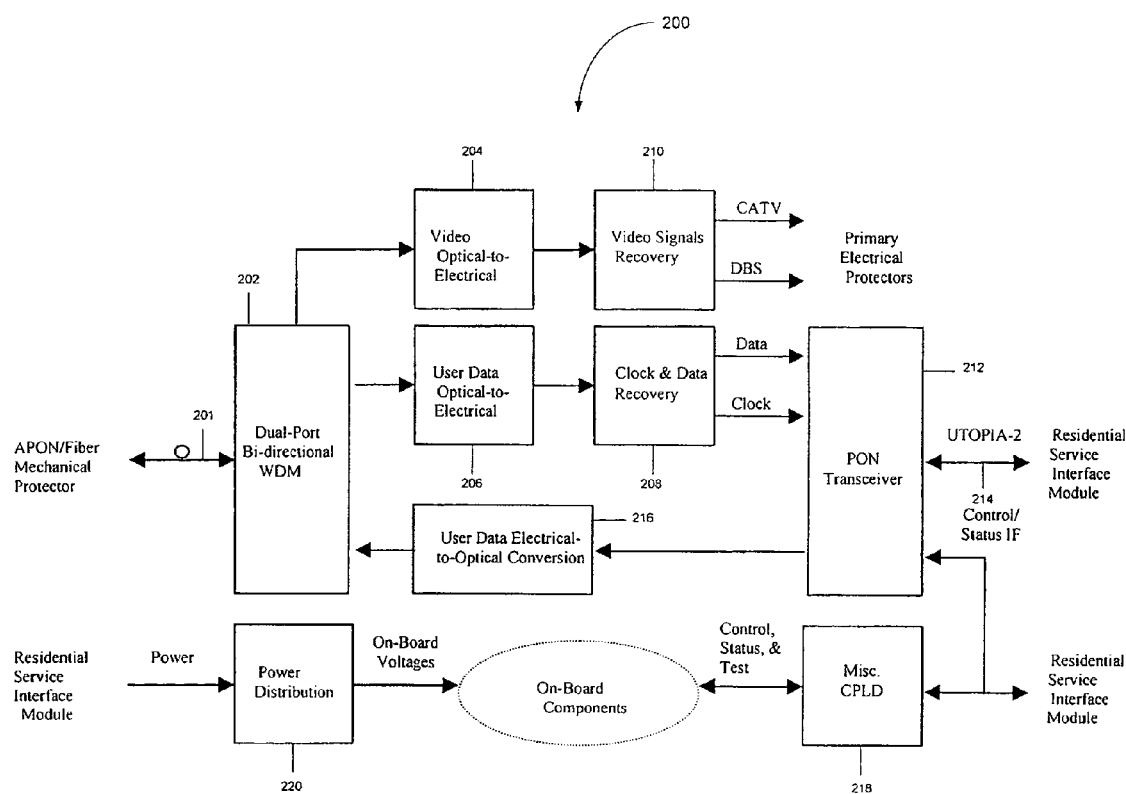
FIG. 5 is a block diagram of an exemplary embodiment of an ATM passive optical network interface block in a broadband home unit.

Now with reference to FIG. 5, illustrated is a block diagram of an exemplary PON interface module 200. The PI module is preferably contained within an electronic enclosure along with the RSI module and the Future Expansion module. The exemplary PON interface module 200 comprises a dual-port bi-directional WDM 202 that provides a physical interface for an optical fiber 201 from the Passive Optical Networks (PON). The dual-port bi-directional WDM 202 also performs a wavelength division multiplexing function in the PI module 200.

The exemplary PI module 200 also comprises a video optical-to-electrical conversion circuit 204 and a user data optical-to-electrical conversion circuit 206. The optical-to-electrical conversion circuits 204 and 206, respectively, convert received optical signals to electrical signals having video content and electrical signals having user data content.

The exemplary PI module 200 further comprises a clock and data recovery circuit 208. The clock and data recovery circuit 208 recovers clock information and data and telephony ATM cells from the electrical signals having user data content. The clock and data recovery circuit 208 also processes PON physical layer according to the ITU-T G.983.1.

The exemplary PI module 200 also comprises a video signal recovery circuit 210. The video signal recovery circuit 210 is operative to recover CAN and/or DBS video signals and to provide the recovered CAN and DBS video signals to the primary electrical protectors 114.

The exemplary PI module 200 also comprises a PON transceiver 212. The PON transceiver 212 transports ATM cells to and from the RSI module 300 preferably via a Utopia-2 port 214. The PON transceiver 212 also preferably provides status information to the RSI module 300.

The exemplary PI module 200 comprises a user data electrical-to-optical conversion circuit 216. The electrical-to-optical conversion circuit 216 converts electrical ATM cells received from the PON transceiver 212 to optical signals and forwards the optical signals to the dual-port bi-directional WDM 202 for transmission over the optical fiber 201.

The exemplary PI module 200 comprises a control PLD circuit 218. The control circuit 218 receives control instructions from the RSI module 300 and, based on those control instructions, exchanges control, status, and test instructions and information with other components of the PI module 200. The control circuit 218 also preferably provides status information to the RSI module 300 and provides test ports and loop-backs.

The exemplary PI module 200 further comprises a power distribution circuit 220. The power distribution circuit 220 preferably receives power from the RSI module 300. The power distribution circuit 220 also preferably comprises on-board DC/DC converters and/or voltage regulators and possible fusing for meeting the power needs of the PI module 200.

Figure 6:
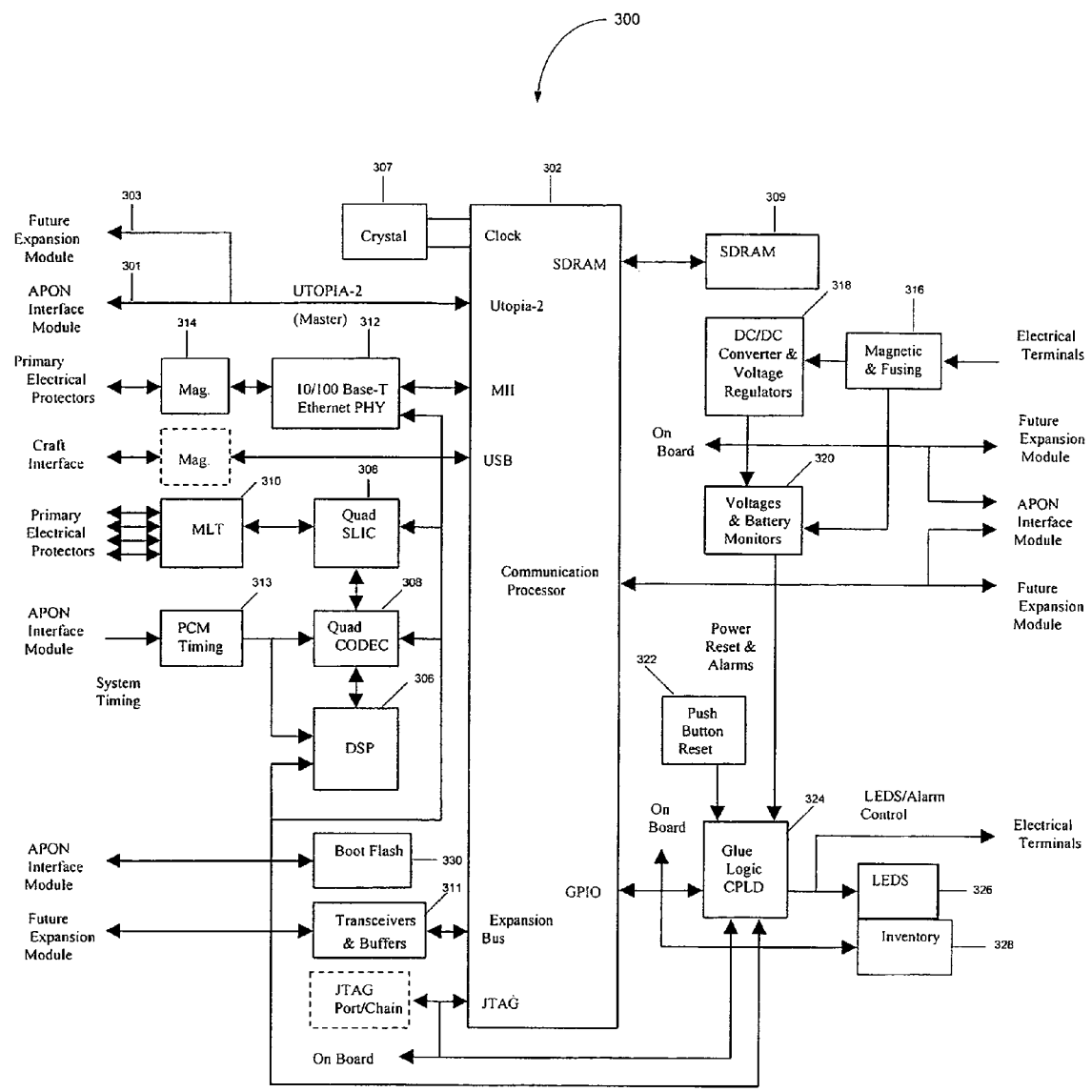
FIG. 6 is a block diagram of an exemplary embodiment of a residential service interface in a broadband home unit.

Now with reference to FIG. 6, illustrated is a block diagram of an exemplary Residential Service Interface (RSI) module 300. The RSI module 300 transports ATM cells to and from the PI module 200 via a Utopia-2 port 301. The RSI module 300 also preferably transports ATM cells to and from the future expansion module 112 via another Utopia-2 port 303. The RSI module 300 preferably configures and controls the whole BHU 100 in accordance with requests by the OLT 12 via OMCI cells. The RSI module 300 preferably collects status information from various components of the BHU 100 and transports the status information to the OLT 12 via OMCI cells.

The exemplary RSI module 300 comprises a communication processor 302. The communication processor 302 processes and manages ATM Layer, ATM Adaptation Layer, and OMCI layer. The communication processor 302 also provides priority queuing, traffic scheduling, and traffic shaping. The communication processor 303 performs networking processing, protocol processing and central control and status collection. The communication processor 303 is also usable for testing and operation of other modules and components in the BHU 100.

The exemplary RSI module 300 also comprises supporting elements for supporting the operation of the communication processor 302 such as a crystal oscillator 307, memory 309 such as SDRAM, and transceiver and buffer circuits 311, which allows for an expansion bus for a future expansion module.

For providing telephony services, the exemplary RSI module 300 comprises a DSP 304 for processing voice channels. The DSP 304 may also be used for voice enhancements such as compression. The exemplary RSI module 300 also comprises a quad CODEC 306 and a quad SLIC 308 for further processing telephony signals. The exemplary RSI module 300 also comprises a MLT circuit 310 for providing remote mechanized line-testing capability for multiple POTS/ISDN interfaces. The POTS/ISDN interfaces are coupled to the primary electrical protectors.

The exemplary RSI module 300 preferably comprises a PCM timing circuit 313. The PCM timing circuit 313 preferably includes a phased locked loop circuit for allowing for voice processing to be phase locked to the system timing reference.

For providing data services, the exemplary RSI module 300 comprises a 10/100 Base-T Ethernet Physical circuit 312 and a magnetic circuit 314 for providing a 10/100 Base-T Ethernet interface. The 10/100 Base-T Ethernet interface is coupled to the primary electrical protectors.

The exemplary RSI module 300 preferably comprises a magnetic and fusing circuit 316 for receiving power from the electrical terminals and for passing the received energy to a DC circuit 318. The DC circuit 318 preferably comprises DC/DC converter and/or voltage regulator circuits. The DC circuit 318 provides energy for meeting the power needs of the RSI module 300 and for providing energy to meet the power needs of the PI module 200 and the Future Expansion module 112. The exemplary RSI module 300 also preferably comprises voltages and battery monitors 320 for monitoring voltages and battery levels in the BHU 100.

The exemplary RSI module 300 preferably provides a system monitoring capability. To support the system monitoring capability, the RSI module 300 preferably comprises a push button reset circuit 322 that provides a mechanism for resetting the unit. The RSI module 300 also preferably comprises a control PLD 324, LEDs 326, and an inventory circuit 328. The LEDs 326 preferably provide visual status indications for link status, voice status, CATV status, DBS status, data link, and data activity. Status indications may also be transmitted in a manner that allows a technician to receive them electronically. Test capabilities of the exemplary RSI module 300 includes test points/ports, USB debug port, push-button reset (forced) and watchdog timers.

The exemplary RSI module 300 also includes boot flash memory for use by various modules such as the PI Module 200, the RSI module 300, and the FE module 112 when booting up. The exemplary RSI module 300 may optionally include development Interfaces such as a JTAG port and/or USB port for use during development, manufacturing, and/or testing.

Regarding the operation of the exemplary RSI module 300, the exemplary RSI module 300 transports ATM cells to and from the PI module via a Utopia-2 port. The exemplary RSI module 300 is capable of transporting ATM cells to and from the Future Expansion module via another Utopia-2 port. The exemplary RSI module 300 can configure and control the entire BHU 100 upon request by the OLT via OMCI cells. The exemplary RSI module 300 collects status information from various BHU modules, maps status information into OMCI cells, and transports OMCI cells back to the OLT. The exemplary RSI module 300 provides power to the PI module and the Future Expansion module. The exemplary RSI module 300 processes and manages ATM Layer, ATM Adaptation Layer, and OMCI layer. The exemplary RSI module 300 provides 4 POTS and 1 10/100Base-T Ethernet interfaces. The exemplary RSI module 300 includes an on-board communication processor for networking processing, protocol processing and central control and status collection. The exemplary RSI module 300 provides priority queuing, traffic scheduling, and traffic shaping for ATM traffic. The exemplary RSI module 300 monitors voltages and battery levels. The exemplary RSI module 300 accommodates inventory data storage. The exemplary RSI module 300 may optionally provide traffic policing for ATM traffic if an ATM UNI interface is added.

Figure 7:
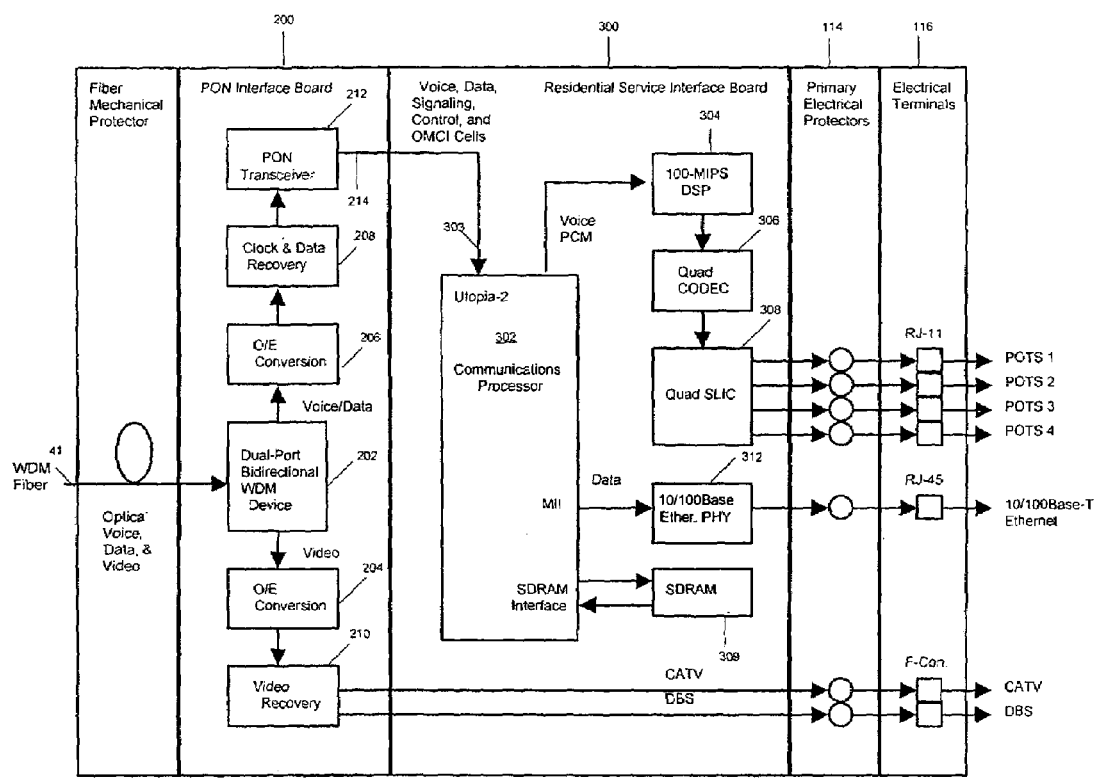
FIG. 7 is a block diagram illustrating an exemplary downstream data path in a broadband home unit.

Referring now to FIG. 7 illustrated is the signal flow in the preferred BHU 100. In the downstream direction, optical signals are received from a PON via an optical fiber 41 and directed to the dual port bi-directional WDM circuit 202 in the PI module 200. In the WDM circuit 202, the optical signals are wavelength de-multiplexed into two separate ports. Preferably 1490 NM signals are received that contain voice, data, and control information and 1550 NM signals are received that include video information. The 1490 NM signals are preferably routed to one port and the 1550 NM signals are routed to another port.

The 1550 NM optical signals containing video information are directed to an optical-to-electrical converter 204 where the signals are converted to electrical signals. The converted electrical signals are directed to a video recovery circuit 210 where the video signals are recovered. The recovered video signals are amplified then directed in turn to the primary electrical protectors 114, electrical terminals 116, and ultimately to a residential unit.

The 1490 NM optical signals containing voice, data, and/or control signals are directed to an optical-to-electrical converter 206 where the signals are converted to electrical signals. The converted electrical signals are directed to a clock and data recovery circuit 208 where clock and NRZ traffic data are recovered.

A system clock reference is derived from the recovered incoming clock. The BHU 100 also uses the recovered incoming clock to transport traffic data upstream. The BHU 100 provides the system clock reference to internal devices that process PON layer and PCM voice traffic.

The PON transceiver 212 receives the recovered traffic data, which may include voice, data, and control information. The PON transceiver 212 converts the traffic data from serial to parallel and performs bit and byte synchronization, searches for cell boundaries and delineates ATM cells. The PON transceiver 212 also checks and corrects HEC with regard to the ATM cells. The ATM cells are processed using VPI cell filtering, header translation, and optional de-churning. A churning key will be provided for upstream traffic if requested by the FTS OLT. Voice, data, signaling, control, and OMCI cells are passed through a Utopia-2 interface to the communications processor 302 in the RSI module 300. Idle cells are not passed but discarded. PLOAM cells are framed up, recovered, extracted, and terminated at the PON Interface module 200. A 1-KHz reference clock is recovered from synchronization field of the first PLOAM cell and is used to synchronize with a local timing counter, so the BHU local timing counter can lock on the FTS OLT counter.

Grants are extracted from PLOAM cells. CRC for each group of grants is checked. Grants are processed when there no CRC errors. The results determine bandwidth allocation, cell slot assignment, ranging, and type of data that can be sent at each time slot.

Messages are also extracted from PLOAM cells. Message CRC is checked. If there is no CRC error, message will then be processed. All OAM related alarms or threshold-crossing alerts triggered by events are transported via messages in PLOAM cells. Also, all ranging related messages are mapped in the message field of PLOAM cells. Once the BHU is in frame sync, the message field is processed independent of the correctness of PLOAM cell header. No error correction is applied to this received message field.

BIP8 of PLOAM cell is also verified. Each BIP8 in each PLOAM cell is used for monitoring the BER on the downstream link. Each BIP8 covers 27 ATM cells and its PLOAM cell. BIP8 is an estimate for the real BER when the BER is smaller than 10E04.

The PI module monitors all OAM errors related to PON Physical Layer such as TF, LOS, PEE, SUF, OAML, SD, LCD, FRML, ERR, MEM, DACT, and MIS.

The RSI module 300 receives voice, data, signaling, control and OMCI cells from the PI module 200 via a Utopia-2 interface. The RSI module 300 provides priority queuing, scheduling, traffic shaping, Ethernet bridging, and other services. The RSI module 300 also manages physical interfaces such as Utopia-2, 10/100Base-T, and peripheral ports.

The RSI module 300 terminates ATM AAL-1/2 voice cells. The communication processor 302 routes PCM voice traffic to the DSP 304. The DSP 304 processes voice channels. The PCM voice channels are sent in turn to the CODEC 306, the SLIC 308, the primary electrical protectors 114, the electrical terminals 116, and finally to the residential unit via telephony lines.

The RSI module 300 also terminates ATM AAL-5 data cells. The communication processor 302 routes user data traffic to the Ethernet PHY device 312. User data traffic from Ethernet PHY device 312 is sent in turn to the primary electrical protectors 114, the electrical terminals 116, and finally to the residential unit via a data port such as 10/100Base-T Ethernet.

Figure 8:
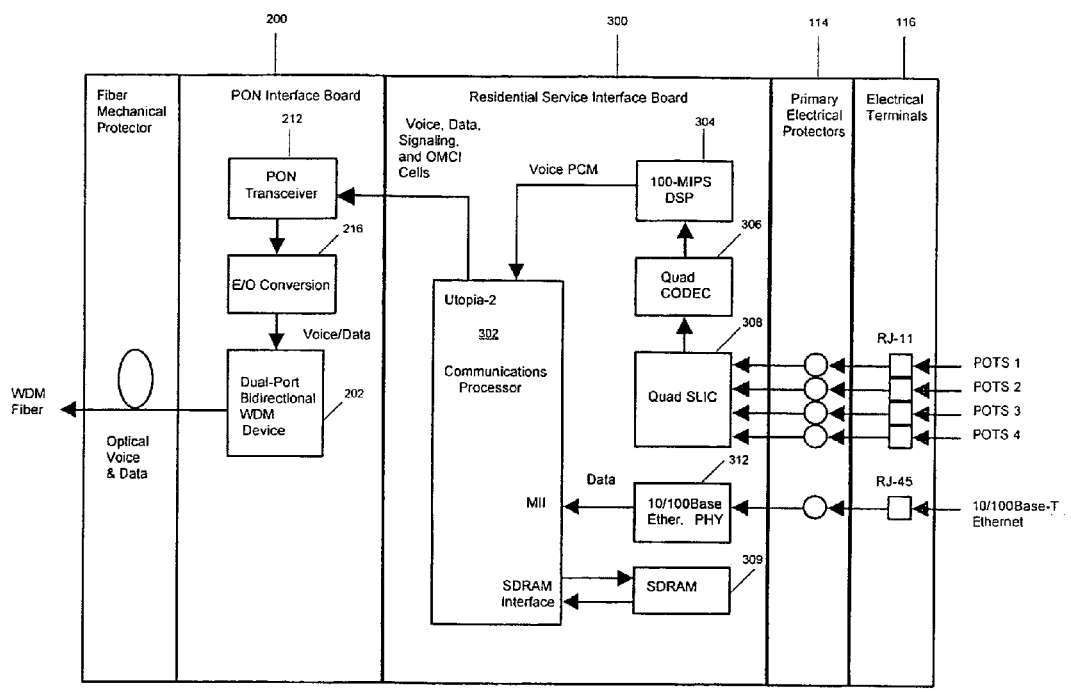
FIG. 8 is a block diagram illustrating an exemplary upstream data path in a broadband home unit.

With reference to FIG. 8, in the upstream direction, PCM voice traffic is received from a residence via telephony lines. The PCM voice traffic is directed to the electrical terminals 116 and then to the primary electrical protectors 114. From there, the PCM voice traffic is sent to and processed, in turn, at the SLIC 308, CODEC 306, and DSP 306. The communication processor 302 next segments and assembles the PCM traffic data into ATM AAL-1/2 cells.

User data traffic is received from a residence via a data port. The User data traffic is directed, in turn, to the electrical terminals 116, the primary electrical protectors 114, and then to a PHY device 312. The communication processor 302 next segments and assembles the User data traffic into ATM AAL-5 cells. All ATM traffic from the RSI module 300 is queued, scheduled, possible shaped if required, and finally transmitted to the PI module 200 via a Utopia-2 interface.

The PON transceiver in the PI module 200 then combines received traffic from the RSI module 300 with data generated in the PI module 200, such as PLOAM cells and mini-slots, and transmits the combined information onto a single parallel bus to the E/O conversion circuit 216. The data is preferably formatted according to the G.983.1 upstream format. The E/O conversion circuit 216 serializes and converts the data to an optical signal. The optical signal is wavelength multiplexed at the WDM device 202, transmitted onto a fiber at a 1310 NM wavelength, and transported upstream to the FTS OLT via a PON.

Figure 9:
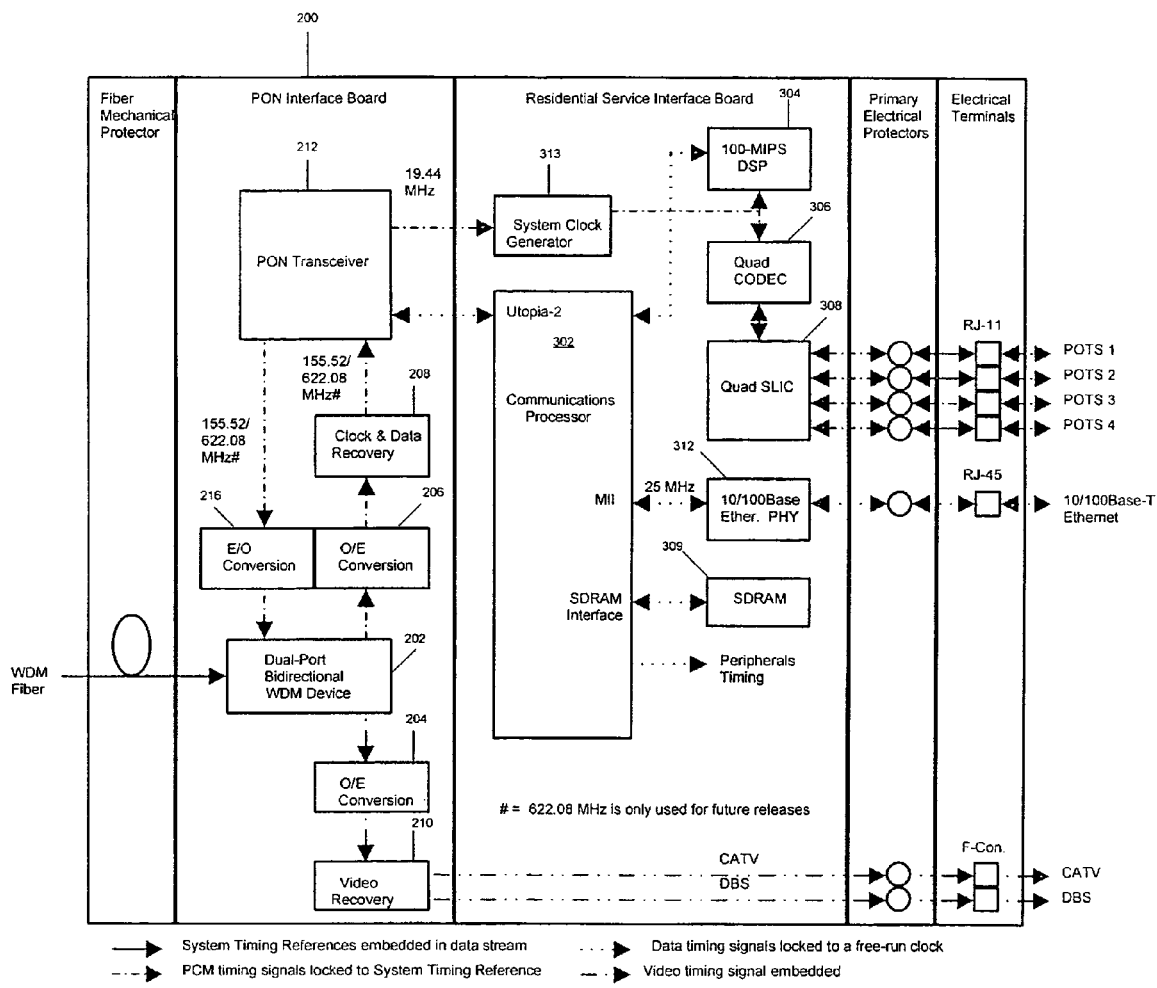
FIG. 9 is a block diagram illustrating an exemplary timing path in a broadband home unit.

FIG. 9 illustrates exemplary timing paths in the exemplary BHU 100. Illustrated are four timing paths: system timing references embedded in data stream, PCM timing signals locked to system timing reference, data timing signals locked to a free-run clock, and embedded video timing signals. The clock signal recovered by the clock and data recovery circuit 208, which is recovered from the PON, is used for timing all outputs of the BHU 100. In circumstances wherein the BHU is not connected to the PON, such as during certain maintenance operations, a free run clock can be used for system timing.

Figure 10:
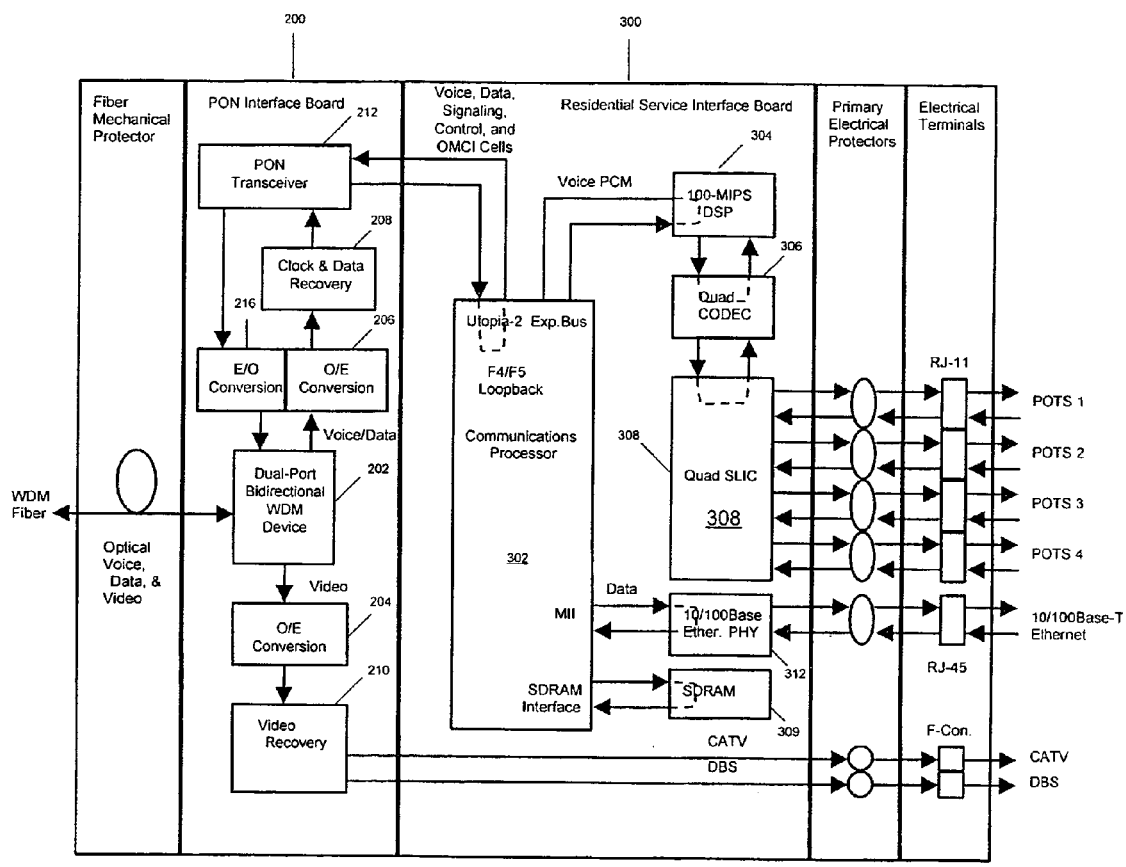
FIG. 10 is a block diagram illustrating an exemplary fault isolation path in a broadband home unit.

FIG. 10 illustrates exemplary fault isolation mechanisms in the exemplary BHU 100 that provide remote testing capabilities. A F4/F5 loopback of ATM cells is provided to isolate the residential unit interfaces. The F4/F5 loopback provides a loop between the OLT 12 and the communication processor 302 to allow for remote fault condition isolation testing for determining if a fault exists between the OLT 12 and the communication processor 302. In the voice path, loopbacks exist at the DSP 304, CODEC 306, and SLIC 308 for remotely determining if any of those devices are producing faults. In the data path, a loopback exists in the Ethernet PHY interface 312 for remotely determining if the Ethernet PHY 312 is producing a fault. Also, a RAM loopback test is provided for remotely determining if a fault condition exists with the RAM 309.

With regard to telephonic services, the preferred BHU 100 supports up to four POTS interfaces. The POTS interface preferably comprises a standard RJ-11 connector. The preferred BHU 100 operates PON interface and voice traffic with clock extracted from the PON interface. The preferred BHU 100 supports Constant Bit Rate (CBR) for telephone services also supports rtVBR (real time variable bit rate). The preferred BHU 100 is capable of providing telephony services using VoATM AAL-2 transport. The preferred BHU 100 supports GR-303 and INA TDM network logical interfaces. The preferred BHU 100 supports Robbed-Bit CAS for POTS interface. The preferred BHU 100 complies with BLES 1.0, ATM Forum VMoA-000145, Profile 9: G.711 PCM with 44-Byte packet size. The preferred BHU 100 provides echo cancellation according to G.168. The preferred BHU 100 provided fax/modem tone detection and response appropriately such as no echo cancellation and voice compression. The preferred BHU 100 supports mu-law coding. The combination of the preferred BHU 100 and an external HEG provides all CLASS features and on-hook transmission capabilities. These services meet the requirements of Section 3.4 of GR909. The preferred BHU 100 is able to set loop-back configuration before SLIC and after SLIC. The preferred BHU 100 provides Mechanize Loop Test (MLT) capabilities that meet the requirements of GR-909. The preferred BHU 100 provides SIP capability.

The preferred BHU 100 can optionally support an ISDN interface in place of or in combination with a POTS interface or some other interface. The preferred BHU 100 can optionally support real-time Variable Bit Rate (rtVBR) for telephony services. The preferred BHU 100 may optionally provide Mechanize Loop Test (MLT) capabilities. The preferred BHU 100 may optionally be capable of providing voice/telephony services using VoATM AAL-1 transport. The preferred BHU 100 may optionally be capable of providing voice/telephony services using VoIP over ATM AAL-5 transport. The preferred BHU 100 may optionally support voice compression. The preferred BHU 100 may optionally detect fax and analog modem and be capable of processing these non-compressing data formats appropriately. The preferred BHU 100 may optionally support the following TDM network logical interfaces: TR-08 Mode 1 & 2, V5.1, and V5.2. The preferred BHU 100 may optionally support 2B+D CCS for V5.x ISDN interface. The preferred BHU 100 may optionally support 3-DSO CCS for GR-303 ISDN interface. The preferred BHU 100 may optionally comply with others ATM Forum VMoA-000145 profiles. The preferred BHU 100 may optionally comply with Megaco H.248. The preferred BHU 100 may optionally support other vocoders. The preferred BHU 100 may optionally provide A-law coding.

With regard to data services, the preferred BHU 100 supports one Ethernet 10/100Base-T data interface. The Ethernet 10/100Base-T data interface preferably comprises a standard RJ-45 connector. The connection is preferably a standard DCE connection. The preferred BHU 100 is able to set 10/100Base-T Ethernet interface for 10BaseT or 100BaseT with half-duplex or full-duplex or auto-sense configuration. The default configuration preferably is auto-sense. The preferred BHU 100 is able to provide information regarding the operational state of Ethernet interface to the OLT 12. Preferably the OLT 12 enables or disables the Ethernet interface in the preferred BHU 100. The preferred BHU 100 supports Unspecified Bit Rate (UBR) and UBR with Minimum Desired Cell Rate (MDCR) for data services with the default preferably being UBR. The BHU optionally supports non-real-time Variable Bit Rate (nrtVBR). The preferred BHU supports both IEEE 802.3 and Ethernet frame formats.

The BHU 100 may optionally provide an ATM UNI interface. If the BHU provides an ATM UNI interface, the BHU 100 preferably supports ATM Forum UNI 3.1 and/or ATM Forum UNI 4.0. If the BHU 100 supports ATM UNI interface, the BHU preferably has the ability to simultaneously support both ATM Forum UNI 3.1 and ATM Forum UNI 4.0 on all of its ATM UNI interfaces.

The BHU 100 preferably supports PPP over Ethernet by forwarding PPPoE packets between LAN and WAN. The preferred BHU 100 will not need to take an active part in the discovery phase, but will permit the passage of PPPoE frames between LAN and WAN ports. The BHU 100 preferably provides a PPPoE only mode, whereby the only frames forwarded are those with EtherTypes of 0x8863 and 0x8864. This provides a method of filtering local LAN traffic from WAN-bound traffic. This ensures that local LAN traffic will not be bridged onto the WAN interface, saving bandwidth on the WAN interface. The preferred BHU 100 supports the spanning tree function described in IEEE 802.1 D. This function could be enable/disable remotely via the OLT 12. The preferred BHU 100 supports broadcast and multicast traffic forwarding. Broadcast or multicast traffic from the LAN is preferably forwarded to all configured WAN ports. Broadcast or multicast traffic from the WAN ports is preferably forwarded only to the LAN port, not to the other WAN ports.

The BHU 100 preferably provides a minimum of 250 filter entries that are shared between static entries and dynamic entries. The proportion of entries allocated to each type preferably is not fixed and any entries not used for static entries are preferably available for dynamic entries. At least 25% of the filter table size preferably is available for static entries. Furthermore, the entries preferably are shared across all LAN and WAN bridge ports. Although many WAN ports may be configured, preferably a single WAN port and single LAN are configured. Therefore the filter table entries are preferably shared in a flexible manner between bridge ports. The table entries preferably are split between static and dynamic filter tables, with up to Filter Statistics. For dynamic filtering, the filter table preferably is updated from the MAC self-learning process by adding the source MAC addresses of received upstream and downstream packets to the dynamic filtering database (if not already present). If new static entries are configured and the filter database is full, then the oldest dynamic entries preferably are removed to allow the new static entries to be added to the filter database. If the database is full, then the oldest dynamic entry preferably is removed from the database and the new entry added in its place. The preferred BHU 100 maintains a count of the number of times this circumstance occurs. The aging timeout for dynamic entries preferably is 300 s by default, but preferably is configurable from the OLT 12 in the range of 10 s-106 s (11.57 days) in multiple steps.

Preferably, it is possible to enable/disable learning under the OLT 12 control on a BHU basis. The bridge function preferably provides the filtering function process defined in IEEE 802.1 D. It preferably provides static and dynamic filtering capabilities. The BHU 100 preferably supports the learning bridge function described in IEEE 802.1 D. This function preferably can be enabled/disabled remotely via the OLT 12. Initially the bridge will not know the addresses of the hosts connected to the LAN and WAN interfaces. When it receives a packet from a host, it will examine the source MAC address and store it in the filter table along with the port number on which the packet was received; i.e. it will 'learn' the MAC address. If the packet was from the LAN interface, it will forward it to all configured WAN ports. If the packet was received from a WAN port, it will be forwarded to the LAN port only. Subsequently it may receive a packet with a destination address that is present in the filter table; i.e. an address that has been learnt. The port number stored in the filter table will tell the bridge which port this host is connected to. The bridge will then forward the packet on this port. If it happens that the port is the same one as the packet was received on, then the packet is not forwarded, it is just dropped. (This situation will occur for traffic within entirely within the LAN or WAN).

The BHU 100 may optionally have an ATM Forum or USB interface for data services. HomePNA optionally may be supported via the Ethernet interface using a HomePNA to Ethernet bridge device. The BHU 100 preferably supports native LAN service set-up and tear down as per Appendix 1.2.13, 1.2.14 ITU-T G.983.2. PPPoA preferably is implemented if the BHU 100 contains an IP router. Such a router acts as the default gateway for the home network. The BHU preferably provides PPTP to PPPoA relay function. The BHU 100 preferably supports Available Bit Rate (ABR) and Guaranteed Frame Rate (GFR) with the default of UBR.

With regard to video services, the preferred BHU 100 supports Direct-To-The-Home (DTTH) video transport using WDM multiplexing. The optional video "capable" interface supports CATV (54 MHz-870 MHz). The BHU may optionally include video "capable" optional feature and is video "ready", that is, capable of providing video services via a remote software download and/or provisioning message. The BHU video-receiver wavelength preferably complies with the ITU-T Draft G.983.3 wavelength-allocation plan. The optional video interface preferably comprises a standard 75-52 F-type female coaxial connector that supports standard RG-6 coaxial cable. With use of the BHU 100, installation of video service preferably does not impact service to any other customer on the PON and does not impact delivery of other services to the same BHU. The BHU 100 preferably is able to turn on/off the CATV output. The BHU 100 preferably is able to detect the "live" presence of the CATV input. The CATV-based video system supports analog and/or digital video.

The preferred BHU 100 optionally has a DBS video interface (950 MHz-2050 MHz) and can turn on/off the DBS output. The preferred BHU 100 is able to detect the "live" presence of the DBS input. The CATV-based video system preferably supports 64-QAM digital video. The BHU 100 preferably provides a digital based return path. Switched Digital Video (SDV) optionally may be supported preferably when 622.08-Mbps downstream is implemented. The CATV-based video system preferably supports 256-QAM digital video.

The BHU 100 optionally has have several modes of usage such as a BHU installation mode, a BHU removal mode, a BHU fault management/detection/prevention mode, a BHU provisioning mode, a BHU surf net mode, a BHU watch TV mode, and a BHU phone call mode.

The BHU installation mode may include Power ON, POST, Ranging, OMCC establishment, Persistence Retrieval, MIB Synchronization, and others. The BHU removal mode may include BHU reinstallation, BHU move to new location, and others. The BHU Fault Management/Detection/Prevention mode may include Component Failure/Fault Isolation, Manufacturing Component Failure/Fault Isolation, POST Component Failure, MLT, OAM, Check Video Status, Check A/C Power Status, Check Home Ethernet Link Status, Input Power Change such as A/C failure and Switch to D/C, D/C low, and D/C failure, High Power on SLIC, High Current on SLIC, Get Inventory, MIB Audit/Resynch, and others. The provisioning mode may include Ethernet Set up/Tear down, POTS Set up/Tear down, Video enable/disable, Power Shedding Strategy (1-4) Setting, Software Download such as New Version and Old Version, and others. The Surf Net mode may include MAC Aging and Too Many Users (MACs). The Phone Call mode may include originate call (GR-303) BLES (DTMF), originate call (GR-303) BLES (rotary phone), terminate call (GR-303) BLES, send fax (Modem/FSK), receive fax, modem call, and others (such as Silence, Echo, Call Waiting, Caller ID, Security System).

The structural arrangements and steps described herein and shown in the drawings are examples of structures, systems, or methods having elements or steps corresponding to the elements or steps of the invention recited in the claims. This written description and drawings may enable those skilled in the art to make and use embodiments having alternative elements or steps that likewise correspond to the elements or steps of the invention recited in the claims. The intended scope of the invention thus includes other structures, systems, or methods that do not differ from the literal language of the claims, and further includes other structures, systems, or methods with insubstantial differences from the literal language of the claims.

What is claimed is:

1. A device for providing communication services, comprising:
an optical network unit operable to receive optical signals from an optical fiber, the optical network unit operable to convert received optical signals containing voice information to electrical voice ATM cells, the optical network unit operable to convert received optical signals containing data information to electrical data ATM cells, the optical network unit operable to convert received optical signals containing video signals to electrical video signals, the optical network unit operable to convert the electrical voice ATM cells to a telephony format suitable for use at a residential unit, the optical network unit operable to convert the electrical data ATM cells to a data network format suitable for use at the residential unit, the optical network unit operable to provide the electrical video signals directly to the residential unit without conversion to ATM cells.

2. The device of claim 1, further comprising:
a plurality of electrical terminals that provide a connection point for telephony lines that transport telephony format information to/from the residential unit, a connection point for network lines that transport network format information to/from the residential unit, and a connection point for video cables that transport video information to the residential unit.

3. The device of claim 1, further comprising a telephony interface, a 10/100 Base-T Ethernet interface, and a video interface.

4. The device of claim 3, wherein the video interface comprises a CATV interface.

5. The device of claim 4, wherein the CATV interface is operable to turn on and off an output of the electrical video signals.

6. The device of claim 4, wherein the CATV interface is operable to detect a presence of video information in the electrical video signals.

7. The device of claim 3, wherein the video interface comprises a DBS interface.

8. The device of claim 7, wherein the DBS interface is operable to turn on and off an output of the electrical video signals.

9. The device of claim 7, wherein the DBS interface is operable to detect a presence of video information in the electrical video signals.

10. The device of claim 3, wherein the video interface is operable to provide limited bandwidth CATV, DBS, and SDV electrical video signals.

11. A method for providing communication services, comprising:
receiving optical signals from an optical fiber;
converting received optical signals containing voice information to electrical voice ATM cells;
converting received optical signals containing data information to electrical data ATM cells;
converting received optical signals containing video signals to electrical video signals;
converting the electrical voice ATM cells to a telephony format suitable for use at a residential unit;
converting the electrical data ATM cells to a data network format suitable for use at the residential unit;
providing the electrical video signals directly to the residential unit without conversion to ATM cells.

12. The method of claim 11, further comprising:
turning on and off an output of the electrical video signals provided to the residential unit.

13. The method of claim 11, further comprising:
detecting a presence of video information in the electrical video signals.

14. The method of claim 11, further comprising:
providing limited bandwidth CATV, DBS, SDV and/or set-top box return electrical video signals.

15. The method of claim 11, further comprising:
recovering a clock signal from the received optical signals;
deriving a system clock reference from the recovered clock signal.

16. A system for providing communication services, comprising:
means for receiving optical signals from an optical fiber;
means for converting received optical signals containing voice information to electrical voice ATM cells;
means for converting received optical signals containing data information to electrical data ATM cells;
means for converting received optical signals containing video signals to electrical video signals;
means for converting the electrical voice ATM cells to a telephony format suitable for use at a residential unit;
means for converting the electrical data ATM cells to a data network format suitable for use at the residential unit;
means for providing the electrical video signals directly to the residential unit without conversion to ATM cells.

17. The system of claim 16, further comprising:
means for turning on and off an output of the electrical video signals provided to the residential unit.

18. The system of claim 16, further comprising:
means for detecting a presence of video information in the electrical video signals.

19. The system of claim 16, further comprising:
means for providing limited bandwidth CATV, DBS, SDV and/or set-top box return electrical video signals.

20. The system of claim 16, further comprising:
means for recovering a clock signal from the received optical signals;
means for deriving a system clock reference from the recovered clock signal.

* * * * *